United States Patent Office 3,458,999
Patented Aug. 5, 1969

3,458,999
HYDRAULIC CIRCUIT FOR A SELF-CHANGING FOUR-SPEED HYDROSTATIC TRANSMISSION
Smil Reis, Viale Campania 29, Milan, Italy
Filed Dec. 7, 1967, Ser. No. 688,716
Claims priority, application Italy, Dec. 9, 1966, 30,911/66; Dec. 22, 1966, 31,455/66; Jan. 9, 1967, 11,278/67; Jan. 18, 1967, 11,605/67; July 7, 1967, 18,166/67
Int. Cl. F15b 13/09, 1/02; F16h 39/48
U.S. Cl. 60—52          25 Claims

ABSTRACT OF THE DISCLOSURE

The present invention relates to a hydraulic circuit for a self-changing four-speed hydrostatic transmissions. Two unequal fixed displacement pumps driven together by a common shaft and connected in parallel to a delivery line, will deliver a total flow in said delivery line, equal to the sum of the single deliveries of each of said pumps. If one of said pumps is shortcircuited, the flow in said delivery line will be that of the other pump. If the pumps are interconnected in series so that the delivery of one pump feeds the suction of the other pump and the delivery line is branched out from the connecting line between the pumps, the flow in said delivery line will be the difference of the single deliveries of said pumps. Hence, four different deliveries may be obtained from two unequal constant delivery pumps driven together by a common shaft, if properly connected in series and parallel and shortcircuited each at a time. Feeding a hydraulic motor with such four different deliveries, a four-speed hydrostatic transmission may be obtained.

---

The object of the invention is to provide a hydraulic circuit including means, namely automatic directional control valves, for selectively connecting two unequal fixed displacement pumps and a hydraulic motor, in the above-mentioned ways, in order to obtain a self-changing four-speed hydrostatic transmission, the operation of said means being effected by the circuit fluid pressure balanced by a counter-pressure, dependently on the speed of said pumps.

A further object of the invention is that of providing a hydraulic circuit wherein the correct self-changing of the speeds will be effected when the pumps tend either to speed up or to slow down with respect to said hydraulic motor.

Still further, in order to ensure exact speed changing, the automatic directional control valves in the circuit each have, according to the invention, only two service positions.

Provision is further made, for integrating the circuit with means adapted to avoid waterhammer and undesirable excessive pressures in the circuit flow lines, means for reversing the motion of the transmission or bringing it into neutral, means for starting it smoothly and means for refilling the circuit in order to replace possible fluid losses.

The substance of the invention, as summarized in the claims, will appear more clearly from the following description of the circuit and the included equipment, with reference to the accompanying drawings, in which:

Figure 1:
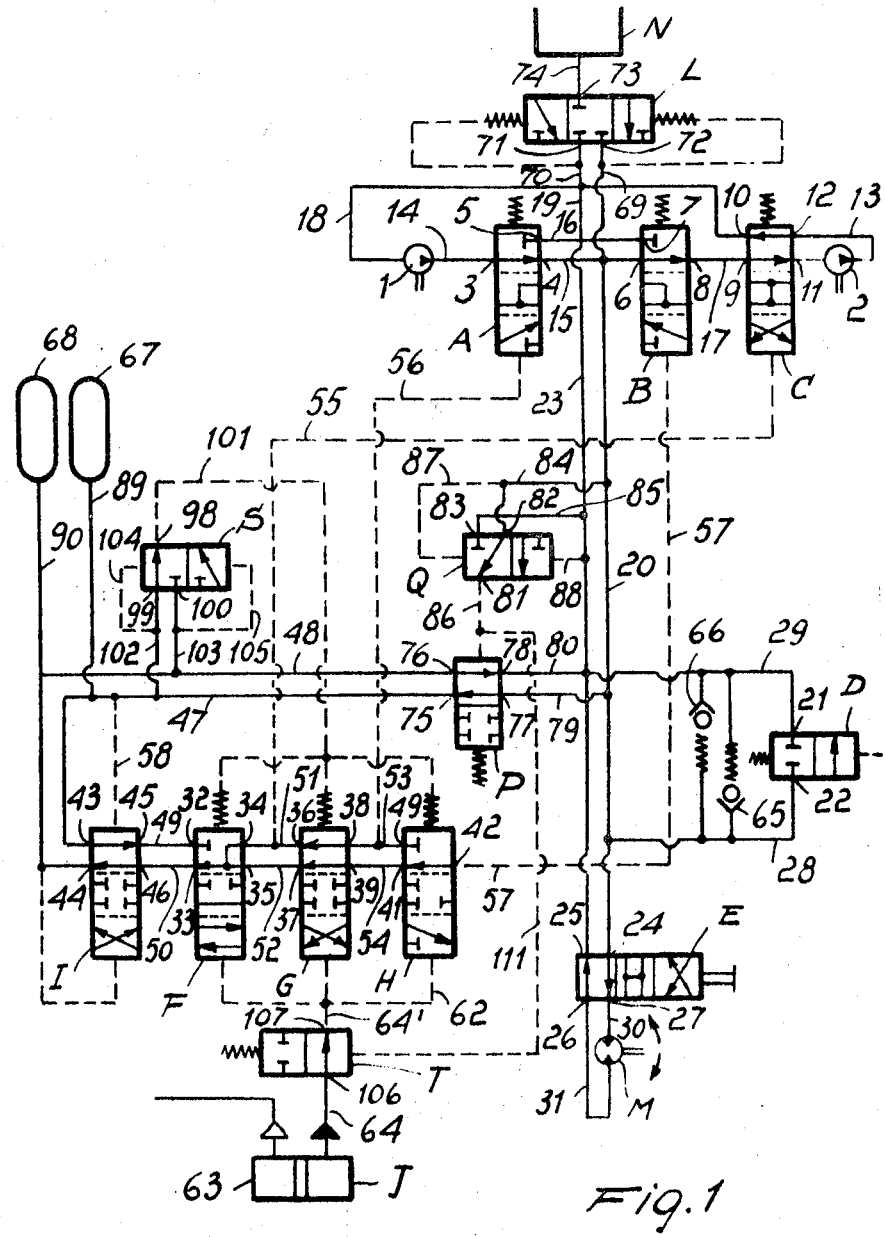
FIG. 1 shows a diagrammatic representation of the circuit, arranged for a first progression of the four speeds.
Figure 6:
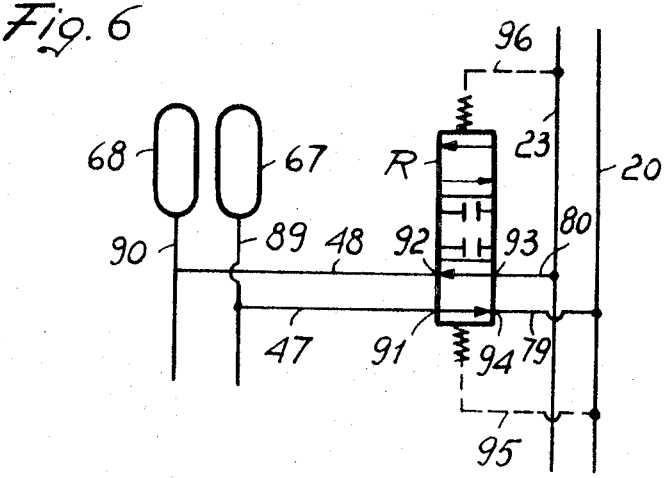
Figure 7:
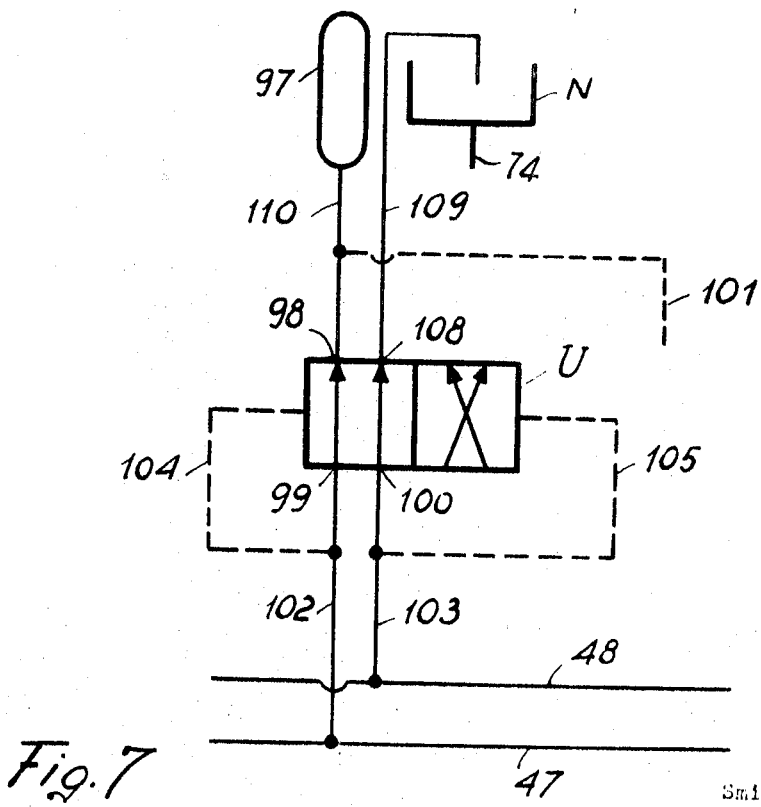
Figure 8:
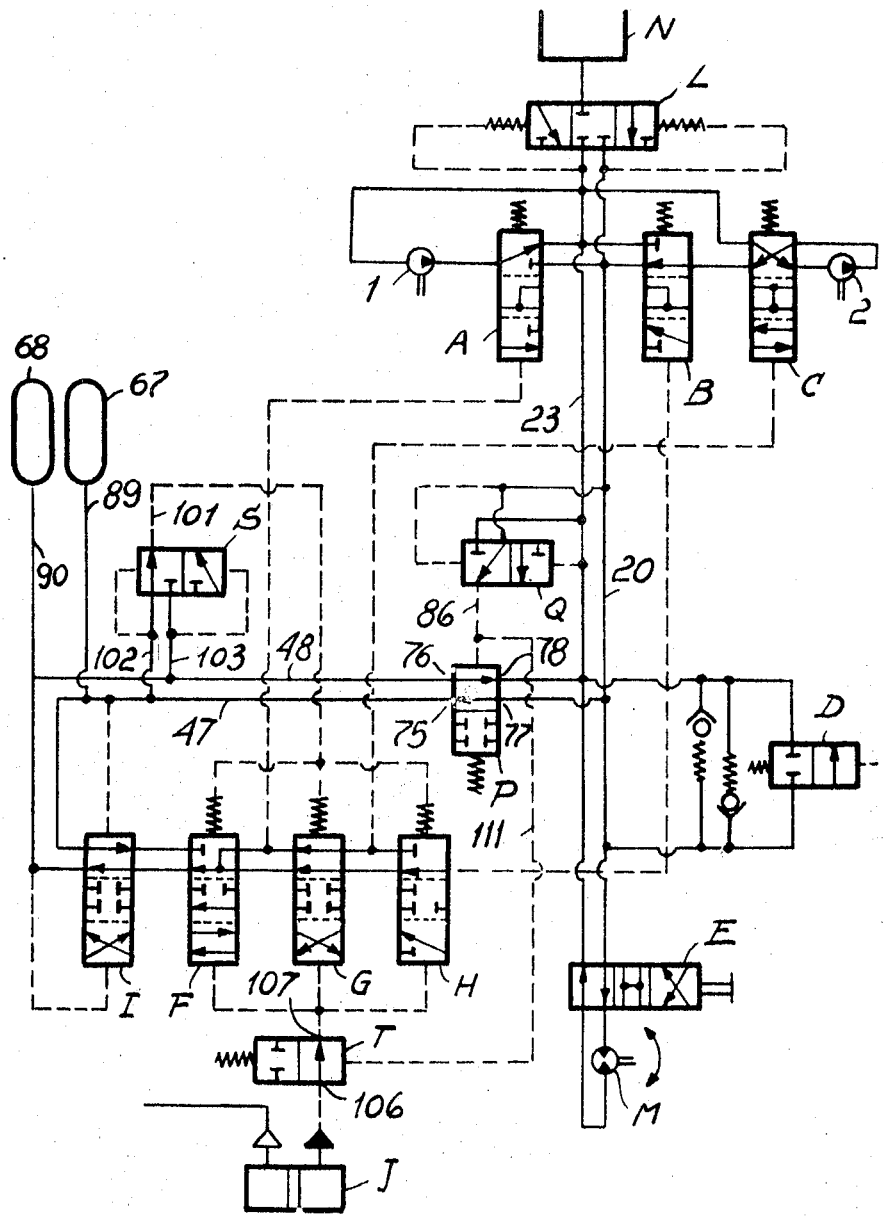

FIG. 6 diagrammatically shows a modification of the circuit of FIG. 1;

FIG. 7 diagrammatically shows a further modification of the circuit of FIG. 1;

FIG. 8 shows a diagrammatic representation of the circuit, arranged for a different progression of the four speeds;

FIGS. 9, 10, 11, 12 show the circuit of FIG. 8, as it appears set for first, second, third and fourth speed, respectively.

The symbols used in the above-listed drawings are in accordance with the "Provisional Recommendation" CETOP/RP3–1965 of the "European oil-hydraulic and pneumatic Committee" of 6, Frankfurt am Main, Mendelssohnstrasse, 73 (VDMA), West Germany.

With reference to FIG. 1, the circuit includes:

A first constant delivery pump 1 and a second constant delivery pump 2, the delivery pump 1 being higher than that of pump 2, and both pumps 1 and 2 being driven by a common shaft;

A first set of three directional control valves A, B, C each with two service positions, a hydraulic control in second position and return spring in the first position, the first two valves A, B each being arranged for short-circuiting one or the other of said pumps, the third valve C being arranged for selectively connecting said pumps 1 and 2 in series and parallel;

A hydraulic constant displacement motor M and two directional control valves, one of said valves being a circuit unloading valve D with two service positions, spring loaded in the first position and manually shifted in the second position or automatically, dependently on the pump speed, said valve being arranged for connecting and disconnecting the delivery line to and from the return line of the circuit respectively; a circuit reversing valve E with three manually controlled service positions for reversing the motion of the hydraulic motor M or setting said motor in neutral;

A second set of three directional control pilot valves F, G, H, each with two service positions, combined hydraulic and spring control in the first position, and hydraulic control dependently on the pump speed in the second position, for directing fluid under pressure from the circuit, to shift the valves A, B, C of the first set, in the second position;

A pilot set flow lines reversing valve I with two service positions and hydraulic control from the circuit in both positions, for automatically connecting the ports of the valves F, G, H of the pilot set to whichever of the delivery or return flow lines of the circuit has the higher fluid pressure;

A counter-pressure control arrangement J, for shifting into the second position the valves F, G, H, of the pilot set against the hydraulic control pressure from the circuit and dependently on the delivery speed of the pumps 1 and 2;

A container N for refilling the circuit with fluid to replace fluid losses, and a container valve L arranged to automatically connect said constainer N with whichever of said delivery or return lines of the circuit has the lower fluid pressure;

A pilot set cut-out valve P for breaking the flow line connections of the pilot set of valves F, G, H and I, with said delivery and return lines of the circuit;

A cut-out control valve Q, for connecting the control in the first position of valve P, to the line of the circuit in which the pressure is higher;

A two paths pilot set control reversing valve S, for connecting the control in the first position of the valves F, G, H of the pilot set, to one of two branch lines, respectively of said delivery and return lines of the circuit;

A counter-pressure cut-out valve T for the hydraulic control in the second position of the valves F, G, H of the pilot set.

With reference to FIG. 1, the first directional control valve A of the first set has a port 3 on one side, and two ports 4, 5 on the opposite side. The internal flow paths of said valve A are: 3–4 and 3–5 in the first and in the second position respectively. In the transient intermediate position, all ports 3, 4, 5 are interconnected so that the valve has an open centre.

Likewise, the second valve B is identical to said first valve A, with the ports marked respectively 8, 6, 7. The internal flow paths are in this case 6–8 and 7–8 in the first and in the second position respectively and the transient centre position is open.

The third valve C has two ports 9, 10 on one side and two ports 11, 12 on the opposite side. The internal flow paths are 9–11 and 10–12 in the first position, and 10–11 and 9–12 in the second position. The transient centre is open.

The connecting flow lines between the pumps 1, 2 and the valves A, B, C, are:

13 from the delivery of pump 2 to the port 12 of the valve C,
14 from the delivery of pump 1 to the port 3 of the valve A,
15 between the ports 4 and 6 of the valves A and B respectively,
16 between the ports 5 and 7 of the valves A and B respectively,
17 between the ports 8 and 9 of the valves B and C respectively,
18 from the suction of pump 1 to port 10 of the valve C,
19 between the lines 18 and 16,
20 delivery branch line from the line 15.

Figure 2:
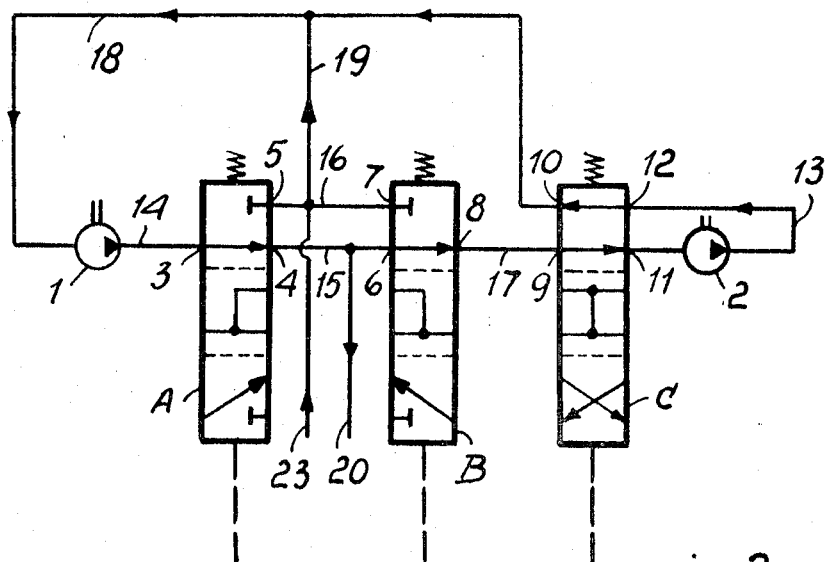
FIGS. 2, 3, 4 and 5 show the circuit of FIG. 1 as it appears set for first, second, third and fourth speed, respectively.

It will be noted that when the valves A, B, C are in the first position as particularly shown in FIG. 2, the delivery of pump 1 is partially returned to the suction of said pump 1, by the second pump 2, while the remainder is fed to the delivery branch line 20.

Figure 3:
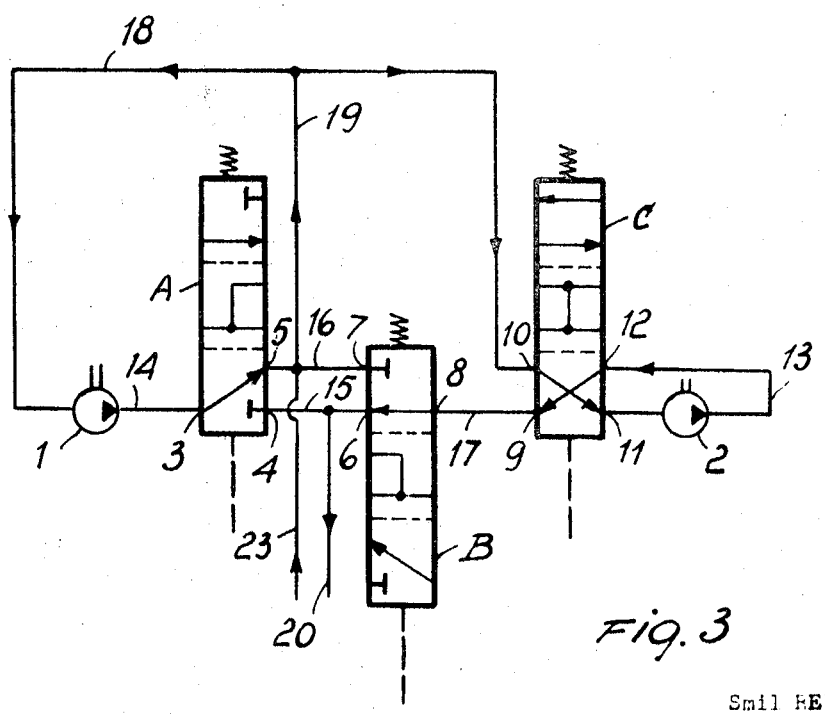

When the first valve A and the third valve C are shifted into the second position as shown in FIG. 3, the pump 1 is short-circuited through lines 19, 18 and path 3–5, while the suction 11 of the second pump 2 is connected to the return line 18 through path 10–11, and the delivery of said pump 2 is connected to the branch line 20 through the paths 9–12 and 6–8, and the lines 17, 15. The available delivery in line 20 is in this case, only that of the pump 2.

Figure 4:
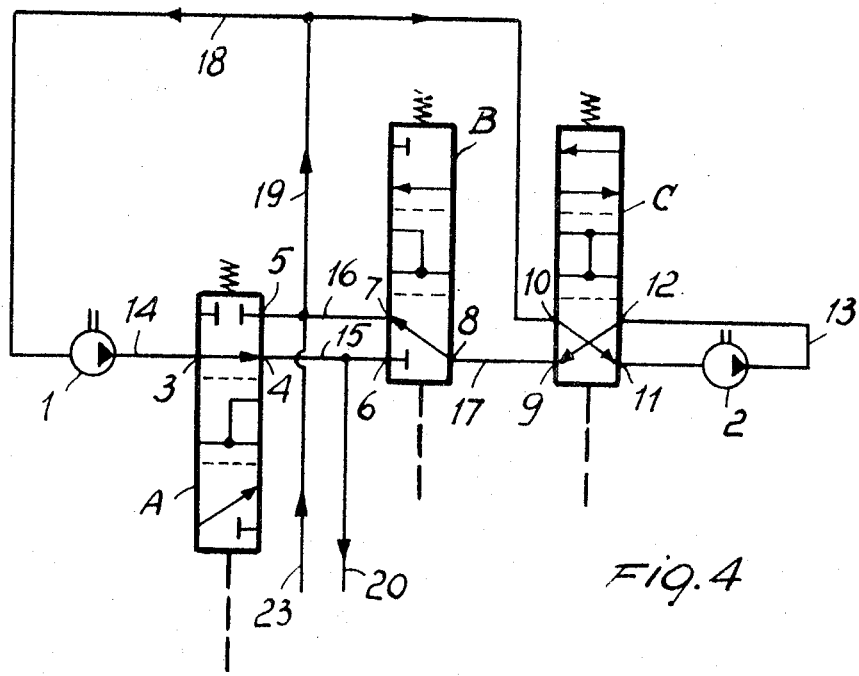

When instead the valve C remaining in its second position, the valve A is returned to the first position, and the valve B is shifted into the second position, as shown in FIG. 4, the delivery of pump 1 is reconnected to the line 20 and the second pump 2 is short-circuited by the route 11, 7–8, 10–11, 9–12, 16, 19, 18, 17, 13. In this case the available delivery in line 20 is that of pump 1 alone.

Figure 5:
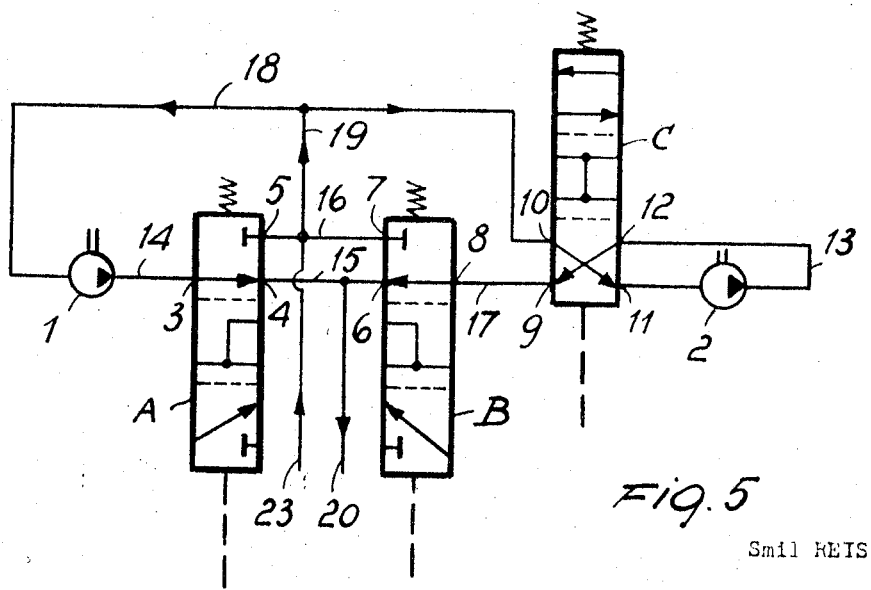

Finally, when with the valve C again in its second position, the valve B is returned into the first position, as shown in FIG. 5, the suction of both pumps 1 and 2 are interconnected, and so are their deliveries 14 and 13, and consequently, the available delivery in the line 20 equals to the sum of the deliveries of both pumps 1 and 2.

In this way, four delivery amounts of pressure fluid are supplied in the line 20, for feeding the constant displacement hydraulic motor M connected to said line 20, and for obtaining four speeds of said motor M, for any given speed of the pumps 1 and 2.

The circuit unloading valve D has two service positions with a single internal flow path in its second position. In the first position, the flow is stopped. The valve D has ports 21 and 22 and the internal flow path is 21–22. In the second position the valve D connects the line 20 to the line 18 through the lines 23 and 19, whence the circuit is idle. The valve D is held in its first position by a spring and may be shifted to its second position, either manually or by an automatic device (not shown) dependently on the pump speed.

The valve E has three service positions of which two are arranged for reversing the motion of the motor M and a third central position for idling. The shifting between said three positions is effected manually. The valve E has ports 24 and 25 on one side, and 27, 26 on the opposite side. Its internal paths are 24–27 and 25–26 in one end position, and 24–26 and 25–27 in the opposite end position. The centre is open with all ports intercommunicating.

The flow line connections between the hydraulic motor M and the valves D and E, are:

20 to the port 24 of the valve E,
23 from the line 16 to the port 25 of the valve E,
28 from the line 20 to the port 22 of the valve D,
29 from the line 23 to the port 21 of the valve D,
30 from the port 27 of the valve E to the inlet of the motor M,
31 from the exhaust of the motor M to the port 26 of the valve E.

The first valve F of the pilot set has two service positions. Its ports are 32, 33 on one side, and 34, 35 on the opposite side. Its internal flow paths are 33–34–35 in the first position, and 32–34 and 33–35 in the second position. In its transient central position, path 32–34 is closed and path 33–35 remains open.

The second valve G of the pilot set, also has two service positions with ports 36, 37 on one side and 38, 39 on the opposite side. In the first position the flow paths are 36–38 and 37–39; in the second position, the flow paths are 36–39 and 37–38. The transient centre is open.

The third valve H of the pilot set is identical to the valves A and B, but its transient centre is closed. Its ports are 40, 41 on one side, and 42 on the opposite side. The flow paths are 41–42 in the first position and 40–42 in the second position.

The pilot set flow lines reversing valve I for connecting the pilot set to the circuit is similar to valve G, but has no spring. Its port are 43, 44 on one side, and 45, 46 on the opposite side. The internal flow paths are 43–45 and 44–46 in the first position, and 43–46 and 44–45 in the second position.

The pilot set cut-out valve P has two service positions with ports 75, 76 on one side, and 77, 78 on the opposite side. Its internal flow paths are 75–77 and 76–78 in the first position and broken in the second position. The valve P is maintained in its first position by hydraulic pressure, and brought to its second position by a counter-acting spring.

The cut-out control valve Q has two service positions with ports 81 on one side, and 82, 83 on the opposite side. Its internal flow paths are 81–82 in the first position and 81–83 in the second position.

The flow line connections of the valves F, G, H, I, P, Q are:

47 from the port 75 of valve P to the ports 43 of the valve I,
48 from the port 76 to the valve P to the port 44 of the valve I,
49 between the ports 45, 32 of the valves I, F, respectively,
50 between the ports 46, 33 of the valves I, F, respectively,
51 between the ports 34, 36 of the valves F, G, respectively,
52 between the ports 35, 37 of the valves F, G, respectively,
53 between the ports 38, 40 of the valves G, H, respectively,
54 between the ports 39, 42 of the valves G, H, respectively,
55 from the line 51 to the valve C for shifting to the second position,
56 from the line 53 to the valve A for shifting to the second position, 57 from the port 42 of the valve H to the valve B for shifting to the second position,
58 from the line 47 to the valve I for shifting to the first position,
59, 60, 61, from the line 101 (described hereinafter) to the valves F, F, H respectively, for shifting to the first position,
62 to the valves F, G, H, for shifting to the second position,
79 from the port 77 of the alve P to the line 20,
80 from the port 78 of the valve P to the line 23,
84 from the port 82 of the valve Q to the line 20,
85 from the port 83 of the valve Q to the line 23,
86 from the port 81 of the valve Q to the valve P for shifting to the first position,
87 from the line 84 to the valve Q for shifting to the first position,
88 from the line 23 to the valve Q for shifting to the second position,
89 from the line 47 to an accumulator 67,
90 from the line 48 to an accumulator 68.

Lines 47, 48 will hereinafter be named as follows:

47 delivery flow line branch
48 return flow line branch.

The shifting to the second position of the valves F, G, H, dependently on the speed of pumps 1 and 2 is effected by a counter-pressure control arrangement J including a vacuum-hydraulic actuator 63, which converts vacuum from the manifold of an internal combustion engine, which drives the pumps, into hydraulic pressure. Said engine is not shown in the drawings. Where however, vacuum is not available, any other kind of device, adapted to provide the shifting power independence of the the pump's speed, may be used instead of the actuator 63, for said purpose.

In the case of the vacuum-hydraulic actuator 63 its vacuum compartment is connected to the engine manifold, and its hydraulic pressure compartment is connected through a flow line 64 to a line 62, which inter-connects the shift controls in the second position, of the vavles F, G, H.

When the fluid pressure from within both lines 20 and 23 sinks down to zero, as happens for instance, valves A, B and C are in their transient open-centre position, valve Q remains unchanged in its position with one path open towards either one or the other of said delivery and return flow lines 20, 23. The fluid pressure from the shift control of the valve P drops down through the line 86 and said valve Q, valve P being thus urged by its spring into the second position. Subsequently, the flow lines 47, 48 are disconnected from lines 20, 23, the internal flow paths of the valve P in the second position being broken.

In this case, the correct working of the pilot set F, G, H and valve I proceeds due to the effect of the pressure from within the accumulators 67, 68, stored at the levels reached at the same instant when the pressures from within the lines 20, 23, dropped.

In order to prevent any change in the counter-pressure transmitted by the arrangement J when the load on the pump prime mover fails with the fluid pressure missing, the two position counter-pressure cut-out valve T is inserted in the flow line 64. Valve T has one flow path 106–107 in its hydraulically controlled first position, said flow path being broken in its spring-loaded second position.

A flow line connection 111 from the line 86, departing from the outlet 81 of the valve Q, conveys the pressure fluid to the hydraulic shift control of the valve T. In this way, when the fluid pressure in the lines 20, 23 fails, the valve T is brought by its spring into the second position, switching off line 64 and locking the reaction of the counter-pressure from the counter-pressure control arrangement J, against the pressure transmitted through a flow line 101 (described hereinafter) from the one of the accumulators 67, 68, which is under pressure.

In order to prevent the pump driving engine from speeding up, when, missing the pressure in the flow lines 20, 23, it is unloaded, a device not shown, actuated by the hydraulic pressure of the circuit against a spring, may be provided.

The hydraulic control of the valves F, G, H in the first position is actuated by the fluid pressure from within the lines 47, 48, through the two-position valve S having two internal flow paths. The control of said valve is effected by hydraulic pressure from within said lines 47, 48.

The valve S is identical to the valve Q. Its ports are 98 on one side, and 99, 100, on the opposite side. Its internal flow paths are 98–99 in the first position, and 98–100 in the second position. Its flow line connections are:

101 from the port 98 to the lines 59, 60, 61,
102 from the port 99 to the line 47,
103 from the port 100 to the line 48,
104 from the line 102 to the control of the valve S in the first position,
105 from the line 103 to the control of the valve S in the second position.

When the fluid pressure is higher in the line 47, it reaches the flow line 101 through the line 102 and the flow path 98–99 of the valve S in the first position. When the pressure is higher in the line 48, it reaches the same flow line 101 through the line 103 and the flow path 98–100 of the valve S in its second position. When the fluid pressure in the lines 20, 23 is missing, the flow line branches 47, 48 are disconnected from said lines 20, 23, by the valve P (as already described) and the fluid pressure within said delivery and return line branches 47, 48, to maintain the correct operation of the circuit, is supplied from the accumulators 67, 68 (as already described).

When the engine and the pumps are at rest, the valves from A to I are, as shown in FIG. 1 in the first position. In this case, the hydraulic motor M is in drive in first speed, because, as already described with reference to FIG. 2, the pumps 1 and 2 are connected in series. Thus, the hydraulic motor M is locked by the stationary engine.

In order to start the engine driving the pumps, the valve E must be brought to its central position. In this case, the inlet and the exhaust of the Motor M, and the lines 20, 18, 19, 23, 48 all inter-communicate, so that the engine and the pumps can be started idle. Bringing the valve D into the second position and the reverse and neutral valve E in one of its end positions, according to the desired direction of rotation, and starting the engine with the pumps 1 and 2, the valve D is allowed to return to its first position, thus connecting the hydraulic motor M to the lines 20 and 23.

Subsequently, a pressure head builds up within the delivery line 20, said pressure head being proportional to the starting resistance of the motor M. A sudden rise in pressure in line 20, and generally waterhammer in the circuit, is prevented by the accumulators 67, 68, said accumulators being connected to the lines 20 and 23, 19, 18, as already described, through the lines 89, 90 respectively, the lines 47, 48, the valve P and the lines 70, 80. Further, pressure relief valves 66, 65 are arranged between the lines 20, 23 to discharge undesirable excess pressures from the one into the other.

The hydraulic motor M will therefore start progressively when the pressure within the accumulator 67 is sufficiently high to overcome the pressure due to the starting resistance. As soon as the motor M starts, the pressure within the delivery flow line 20 drops, so that by increasing the speed of the engine driving the pumps 1 and 2, the counter-pressure transmitted by the actuator 63 through the lines 64, 62 and the counter-pressure cut-out valve T in the first position, will urge the valves F, G, H into the second position. Said valves F, G, H are set to be shifted to the second position, one at a time, and in progressive succession, by the pressure differential of the fluid from within the lines 47 and 62.

So, the first valve to pass to the second position will be the valve F, whence the flow paths 32–34 and 33–35 will be opened, while the flow paths 36–38 and 37–39 of the valve G in its first position, are already open. The shift to the second position of the valves A and C will therefore be caused by the pressure of the delivery flow line branch 47 by the route: 43–45, 49, 32–34, 60, the valve C and route: 32–34, 51, 36–38, 56, the valve A, with the resulting circuit as shown in FIG. 3, corresponding to the lower intermediate delivery of the pumps 1 and 2, and the second transmission speed.

Increasing further the speed of the pump driving engine, or reducing the resistance against the motion of the motor M, the pressure head transmitted by the vacuum-hydraulic actuator 63 will increase above the fluid pressure from within the lines 47 and 20, and this will cause the shifting of the valve G into the second position. Following this, its flow paths between its ports will be inverted, i.e. 36–39 and 37–38. The flow line 56 will thus be relieved of pressure by the route 37–38, 52, 33–35, 50, 44–46, 48, 23, 16, 19, 18, with the effect of bringing the valve A back to its first position. At the same time, by the route which passes through 36–39, 54, 41–42, 57, the hydraulic control of the valve B is brought into action, shifting said valve B to its second position and bringing the circuit to the form shown in FIG. 4, corresponding to the higher intermediate delivery and the third transmission speed.

Increasing still further the pressure head transmitted by the vacuum-hydraulic actuator 63, the valve H will also be shifted into the second position, closing the path 41–42 and opening the path 40–42. By this, the pressure within the line 57 is relieved and the valve B returns to its first position. The circuit is then as shown in FIG. 5, corresponding to the maximum delivery and the fourth transmission speed.

It should be remembered at this point, that all the time while the above described changes are effected, a pressure head within the delivery line 20 over the pressure from within the return lines 23, 48 is subsisting, and the valve S is kept unchanged in its position as shown in FIG. 1.

If the hydraulic motor should tend for any reason, to speed up with respect to the pumps 1 and 2, the fluid pressure within lines 48, 23, 19, 18, will rise over that from within the line 20, causing the valves I and S to take their second positions. The pressure head from within said line 48 will, in this case, be conveyed through the path 44–45 and the line 49 to the port 32 of the valve F, while the port 33 will then be connected, by the route 50, 46–43, 47 to the line 20, now relieved of pressure.

At the same time, through the valve S in its second position, the lines 59, 60, 61 are now fed with pressure from the line 48, through the path 98–100 and the line 101.

The pilot set F, G, H, remains, therefore, in the same working conditions as before, and consequently, the shifting of the valves A, B, C of the first set can always be effected dependently on the relation between the driving power and the resisting load.

The container valve L has three service positions with spring centering and hydraulic control in the end positions. Its ports 72, 71 on one side, and 73, on the opposite side. Its flow line connections are:

69 from the line 20 to the port 72,
70 from the line 18 to the port 71,
74 from the container N to the port 73.

Its internal flow paths are 72–73 in the first position (on the left side) and 71–73 in the second position (on the right side). The centre position is closed. Control in the first position is effected by the fluid pressure within the line 70 and in the second position by the fluid pressure within the line 69. In this manner, when the fluid pressure is higher in the line 69, the fluid from the container N is admitted through the path 71–73 and the line 70, in the line 18, relieved of pressure. When the pressure is higher within the line 70, the fluid from the container N is fed in the line 20 through the path 72–73 and the line 69.

In the embodiment shown in FIG. 6, the pilot set cutout valve P is replaced by a three position pilot set cutout valve R having three service positions and four internal flow paths. The valve R is spring centered and controlled in its end positions by hydraulic pressure from within the lines 20 and 23. Said valve R renders the use of the valve Q unnecessary. It has two ports 91, 92 on one side, and two parts 93, 94 on the opposite side. Its internal flow paths are 91–94 and 92–93 in both end positions. Its centre is closed. Its flow line connections are:

47 to the port 91,
48 to the port 92,
79 from the port 94 to the line 20,
80 from the port 93 to the line 23,
89 from the accumulator 67 to the line 47,
90 from the accumulator 68 to the line 48,
95 from the shift control in the first position of the valve R to the line 20,
96 from the shift control in the second position of the valve R to the line 23.

The pressure head from within the lines 20 or 23 maintains said valve R in one of said end positions, and therefore said lines 20 and 23 remain connected to the lines 47, 48 respectively. When pressure in the lines 20 and 23 is missing, the valve R is brought by its centering spring into its closed centre position, and said connection between the lines 47, 48 and 20, 23 respectively is broken. Said valve R may therefore perfectly replace the valves P and Q.

In the embodiment shown in FIG. 7, the two accumulators 67, 68 are replaced by a single accumulator 97 connected to both lines 47, 48 by means of the four paths pilot set control reversing valve U. The control reversing valve U is substantially a directional control valve, having, as shown in FIG. 7, two service positions, two ports 99, 100 on one side, two ports 98, 108 on the opposite side, two internal flow paths 98–99 and 100–108 in its first position and two internal flow paths 99–108 and 98–100 in its second position. Its centre is closed and its flow line connection are:

101 from the flow line 59 to the port 98,
102 from the flow line 47 to the port 99,
103 from the flow line 48 to the port 100,
104 from the line 102 to the shift control of the valve U in the first position,
105 from the line 103 to the shift control of the valve U in the second position,
109 from the container N to the port 108,
110 from the flow line 101 to the accumulator 97.

The flow line connection 101 will hereinafter be referred to as "pilot set first position control pressure line."

By this arrangement, when the fluid pressure is higher in the line 47, the valve U is shifted to its first position by said pressure of the line 47, reaching the shift control through the lines 102, 104.

The accumulator 97 will thus be connected through the lines 102, 110 and the path 99–98, to said line 47, while the other line 48 will be connected through line 103, the path 100–108 and the line 109, to the container N. When, instead, the pressure is higher in the line 48, the valve U is shifted into its second position by the pressure from within the lines 103, 105, and the accumulator 97 will be connected to said line 48 through the path 100–98, while the line 47 will be connected to relief through the path 99–108.

When the connections between the lines 47, 58, and the lines 20, 23 respectively, are broken by the valve P or the valve R, the pressure head existing within the accumulator 97 will feed the necessary power for correctly shifting the valves of the pilot set F, G, H and of the first set A, B, C. Within the flow line connection 101 to the shift control of the valves F, G, H in the first position, the pressure is always the same as that within the accumulator 97, to which said line 101 is permanently connected.

The circuit as described up to this point, has the valves A, B, C and their shift controls arranged so that the lowest delivery is obtained as the difference between the single deliveries of the pumps 1 and 2, the intermediate deliveries, from one or the other of said pumps, and the highest delivery, as the sum of the single deliveries of said both pumps.

This arrangement, from which a determined succession of the four deliveries is obtained, can be modified for obtaining another succession of said four deliveries, without departing from the scope of the invention. More precisely, the following succession of the four deliveries may be obtained: the first lowest delivery from the smallest of the pumps 1 and 2; the first lower intermediate delivery, as difference between the single deliveries of said pumps; the higher second intermediate delivery, from the larger pump; the final highest delivery, from the sum of the deliveries of both pumps.

To this end, as shown in FIG. 8, the positions of the valves A and C are inverted so that the valve A has the path 3-5 in its first position, and the valve C has paths 10-11 and 9-12, also in the first position. Further, also the flow line connections of the shift controls of said valves A and C are inverted so that they result:

55 to the shift control of the valve A,
56 to the shift control of the valve C.

Figure 9:
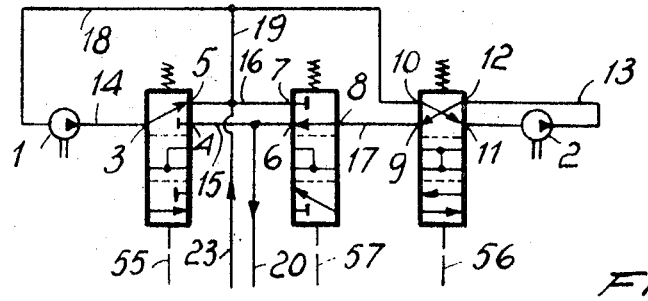

With these modifications, the circuit appears, when the fluid pressure is missing, as shown in FIGS. 8 and 9, wherein the pump 1 is short-circuited through the path 3-5 of the valve A, the delivery of the pump 2 connected to the delivery line 20 through the path 9-12, and the suction of said pump 2 connected to the lines 23, 16, 18 through the path 10-11 of the valve C. In said delivery line 20, the flow is fed by the only pump 2, being thus the lowest.

Figure 10:
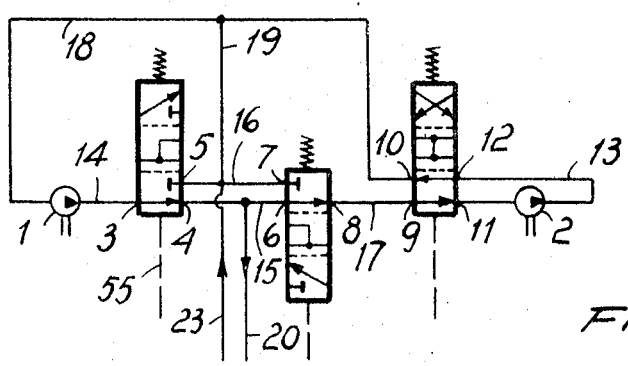

When the hydraulic motor M is started and the starting resistance is reduced, the counter-pressure from the arrangement J overcomes the fluid pressure of said delivery line 20 and its branch line 47, shifting into the second position firstly, the valve F of the pilot set and connecting the lines 55, 56, through the paths 32-34 of the valve F, and 36-38 of the valve G, to said delivery line 20. The valves A and C will thus be shifted into the second position, as shown in FIG. 10, connecting in series the pumps 1 and 2 through the paths 3-4, 6-8, 9-12 and the pertaining flow line connections. The flow that reaches the line 20 in this case will be due to the difference between the single deliveries of the pumps 1 and 2.

Figure 11:
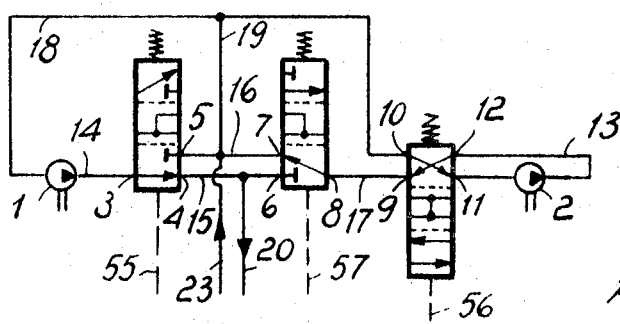

Increasing further the pressure head from the arrangement J, by increasing the pump speed, or reducing the reaction of the hydraulic motor M, the valve G will be shifted into the second position. This will cause on the one hand, the relief of pressure from the line 56 through the path 37-38 of said valve G, and on the other hand, the building-up of a pressure head within the line 57 through the path 36-39 of the same valve G. The valve B will therefore be shifted to its second position, while the valve C will return to its first position, as shown in FIG. 11. The pump 2 will thus be short-circuited through the paths 10-11 and 7-8 of the valves C and B respectively, and the flow that will reach the delivery line 20 will be that of the pump 1 alone.

Figure 12:
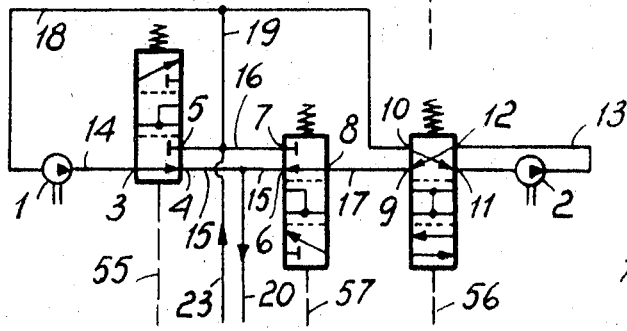

Increasing still further the counter-pressure from the arrangement J, the last valve H of the pilot set will also be shifted into the second position, unloading the line 57 through the path 40-42 and allowing the valve B to return to its first position, as shown in FIG. 12. In this case the deliveries of both pumps 1 and 2 will flow together into the line 20 through the paths 9-12, 6-8 and 3-4.

What I claim is:
1. A hydraulic circuit for a self-changing hydrostatic four-speed transmission comprising.

two fixed displacement pumps driven together by a common driving shaft, the delivery of one of said pumps being lower than that of the other pump;
a constant displacement hydraulic motor;
flow line connections between said pumps and said hydraulic motor for feeding pressure fluid from said pumps to said hydraulic motor;
a first set of three direction control valves each with two service positions, hydraulic control in the second of said two positions against a return spring in the first of said two positions, the first two valves for short circuiting one or the other of said pumps, the third valve for selectively connecting said pumps in series and parallel;
a second set of three-direction control pilot valves, each with two service positions, hydraulic and spring control in the first of said two positions, against control dependent on the pump speed in the second of said two positions; and
flow line interconnections between said pilot valves and flow line connections from said pilot valves to said valves of said first set, for selectively operating said hydraulic control of said valves of said first set.

2. A hydraulic circuit as claimed in claim 1, further comprising
a first flow line connection between the delivery port of the first pump and the first valve of the first set;
a second flow line connection between the first valve of the first set and the second valve of the first set;
a delivery flow line from said second flow line connection to the admission port of said hydraulic motor;
a third flow line connection between said first and second valves;
a return flow line from said third flow line connection to the exhaust port of said hydraulic motor and to the suction port of said first pump;
a fourth flow line connection between the second and third valves of said first set;
a fifth flow line connection from said third valve of the first set to the suction port of said first pump;
a flow line connection from said third valve of the first set to the suction port of the second pump; and
a flow line connection from the delivery port of said second pump to said third valve of the first set.

3. A hydraulic circuit as claimed in claim 1, further comprising:
a pilot set flow lines reversing valve with two service positions, for connecting the second set of pilot valves to the circuit flow lines;
a delivery flow line branch from said pilot set flow lines reversing valve to said delivery line;
a return flow line branch from said pilot set flow lines reversing valve to said return line;
two flow line connections between said pilot set flow lines reversing valve and the first pilot valve of the second set;
a first and second interconnecting flow line between the first and second pilot valves of said second set;
a first and second interconnecting flow line between the second and third pilot valves of said second set; and
a control flow line connection from the third pilot valve of the second set, to the hydraulic control of the second valve of the first set.

4. A hydraulic circuit as claimed in claim 3, further comprising:
a first control flow line from said first interconnecting flow line between the first and second pilot valves to the hydraulic control of the third valve of the first set; and
a second control flow line from said first interconnecting flow line between the second and third pilot valves to the hydraulic control of the first valve of the first set.

5. A hydraulic circuit as claimed in claim 3, further comprising:
 a control flow line from said first interconnecting flow line between the first and second pilot valves to the hydraulic control of the first valve of the first set; and
 a second control flow line from said first interconnecting flow line between the second and third pilot valves to the hydraulic control of the third valve of the first set.

6. A hydraulic circuit as claimed in claim 4 wherein:
 the first and second valves of the first set each have one internal flow path in one position of said two positions and a second internal flow path in the other position; and
 the third valve of the first set has two internal parallel flow paths in one position of said two positions and two internal mutually crossing flow paths in the other position.

7. A hydraulic circuit as claimed in claim 6 wherein:
 said first and second valves of said first set have one internal flow path respectively; both in said first position, and the other internal flow path respectively, in said second position; and
 said third valve of said first set, has the parallel flow paths in said first position, and the mutually crossing flow paths in said second position.

8. A hydraulic circuit as claimed in claim 6 wherein:
 said first valve of said first set has said other internal flow path in said first position;
 said second valve of said first set has said one internal flow path in said first position; and
 said third valve of said first set has said mutually crossing flow paths in said first position.

9. A hydraulic circuit as claimed in claim 7 wherein:
 the first pilot valve of said second set has two internal communicating flow paths in said first position and two internal parallel flow paths in said second position;
 the second pilot valve of said second set has two parallel internal flow paths in said first position, and two mutually crossing internal flow paths in said second position; and
 the third pilot valve of the second set has one internal flow path in said first position, and a second internal flow path in said second position.

10. A hydraulic circuit as claimed in claim 9 wherein the pilot set flow lines reverseing valve for connecting the second set of pilot valves to the circuit has:
 two internal parallel flow paths in said first position, and two mutually crossing internal flow paths in said second position;
 a flow line connection from said delivery flow line to the control in its first position; and
 a flow line connection from said second branch line to the control in its second position.

11. A hydraulic circuit as claimed in claim 10, further comprising:
 a counter-pressure control arrangement dependent on the pump speed, for the control in said second position of the pilot valves of the second set, and a flow line connection from said arrangement to said pilot valves for said control, each pilot valve being arranged to go into its second position at a pressure higher than that of the preceding pilot valve and lower than that of the following pilot valve.

12. In a hydraulic circuit as claimed in claim 11, further comprising:
 a circuit unloading valve for connecting and disconnecting the delivery and return lines to and from each other, respectively.

13. In a hydraulic circuit as claimed in claim 12, further comprising:
 a three-service-position manual-controlled circuit-receiving valve, for connecting the delivery and return lines to each other in central position, and reversing the connections of said lines to the inlet and exhaust ports of said hydraulic motor.

14. A hydraulic circuit as claimed in claim 13, further comprising:
 a fluid container and a three-service-position container valve for continuously refilling the circuit with pressure fluid, said container valve being spring centered and hydraulically controlled in each of its end positions from one or the other of the delivery and return lines, respectively;
 a flow line connection from the said container to said valve, said valve having an internal flow path of said valve in one end position for directing fluid from said flow line connection between the container and the valve into the branch line opposite to the line from which said valve is controlled in said one end position, a second internal flow path of said valve in the second end position, from said flow line connection to the line opposite to that from which said valve is controlled in said second end position, and broken flow paths effective in a central position of said valve.

15. In a hydraulic circuit as claimed in claim 14, two check valves between said delivery and return lines for discharging excess pressure from one of said delivery and return lines into the other of said delivery and return lines.

16. In a hydraulic circuit as claimed in claim 15, two hydraulic pressure accumulators, a flow line connection between one of said accumulators and said delivery line, and a second flow line connection between the second of said accumulators and said return line.

17. A hydraulic circuit as claimed in claim 16, further comprising a two-service-position pilot set cut-out valve inserted in the delivery and return flow line branches between said second set of pilot valves and said delivery and return lines for switching off in its second position, said branch lines from said delivery and return lines.

18. In a hydraulic circuit as claimed in claim 17 wherein said pilot set cut-out valve has two internal flow paths in first position for connecting said flow line branches to said delivery and return lines and broken internal flow paths in said second position for switching said flow line branches off said delivery and return lines.

19. In a hydraulic circuit as claimed in claim 18, a hydraulic control in first position of said pilot set cut-out valve from one or the other of said delivery and return lines according to in which of said lines the pressure is higher, against a return spring into said second position.

20. In a hydraulic circuit as claimed in claim 18, further comprising:
 a two-service-position cut-out control valve with two internal flow paths, one for each position;
 a flow line connection from said valve to the delivery line, for the control of said cut-out control valve in first position;
 a second flow line connection from said valve to the return line, for the shifting of the cut-out control valve to its second position; and
 a third flow line connection from the control of said pilot set cut-out valve to said delivery line through one internal flow path of said two-service-position cut-out control valve in its first position, and to said return line through the other internal flow path of said two-service-position cut-out control valve in the second position.

21. In a hydraulic circuit as claimed in claim 16, further comprising a three-service-position spring-centered pilot set cut-out valve with hydraulic control in the end positions from said branch lines, two internal parallel flow paths per each end position, and broken internal flow paths in the center position.

22. In a hydraulic circuit as claimed in claim 20, further comprising a counter-pressure cut-out valve with two service positions, one internal flow path and hydraulic control in the first position, a broken internal flow path and return spring control in the second position, said counter-pressure cut-out valve inserted in said flow line connection between said counter-pressure control arrangement dependently on the pump speed, and said control in the second position of said pilot valves of the second set.

23. In a hydraulic circuit as claimed in claim 22, further comprising a flow line connection extending from the control line between the first pilot set cut-out valve and the cut-out control valve, to the hydraulic circuit of said counter-pressure cut-out valve.

24. In a hydraulic circuit as claimed in claim 23, further comprising:
- a two-path pilot set control reversing valve with two service positions and two internal flow paths one for each position, and hydraulic control from said flow line branches between the second set of pilot valves and the delivery and return lines;
- a first pilot set control pressure line from said two-path pilot set control reversing valve to the hydraulic control lines of said pilot valves in the first position;
- a flow line connection from said first pilot set control line to one of said branch lines between the second set of pilot valves and the delivery and return lines, through one of said flow paths; and
- a flow line connection from said first pilot set control pressure line to the other of said branch lines between said second set of pilot valves and the delivery and return lines through the other of said flow paths.

25. In a hydraulic circuit as claimed in claim 15, further comprising:
- a fluid pressure accumulator;
- a two-service-position pilot set control reversing valve with four internal flow paths, whereof there are parallel flow paths in the first position and two mutually crossing flow paths in its second position;
- a first flow line connection from said accumulator to the first path of said valve in first position;
- a flow line connection from said first path of said valve in first position, to said delivery line through the delivery branch line to the pilot set;
- a flow line connection from said accumulator to the hydraulic control lines of said pilot valves in the first position; and
- a flow line connection from the return branch line to the fluid container through the second path of said two-service-position pilot set control reversing valve in first position.

References Cited

UNITED STATES PATENTS

| | | | |
|---|---|---|---|
| 1,814,857 | 7/1931 | Rösle | 60—52 XR |
| 2,042,247 | 5/1936 | Blood | 60—52 |
| 2,051,052 | 8/1936 | Morgan | 60—52 XR |
| 2,276,895 | 3/1942 | Vosseler | 60—53 XR |

EDGAR W. GEOGHEGAN, Primary Examiner

U.S. Cl. X.R.

60—53